United States Patent
Yoshizawa

(10) Patent No.: US 7,039,445 B1
(45) Date of Patent: May 2, 2006

(54) COMMUNICATION SYSTEM, COMMUNICATION APPARATUS, AND COMMUNICATION METHOD

(75) Inventor: Junichi Yoshizawa, Ome (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 778 days.

(21) Appl. No.: 09/713,250

(22) Filed: Nov. 16, 2000

(30) Foreign Application Priority Data

Nov. 18, 1999 (JP) ................................ 11-328327

(51) Int. Cl.
*H04M 1/00* (2006.01)

(52) U.S. Cl. ................. 455/575.7; 455/293; 455/41.2; 455/63.4; 343/754

(58) Field of Classification Search ...... 455/41.1–41.3, 455/25, 193.1, 269, 271, 273–277.2, 281, 455/575.7, 575.1, 550.1, 66.1, 344, 461 455/63.4; 343/754–766
See application file for complete search history.

(56) References Cited

U.S. PATENT DOCUMENTS

| | | | |
|---|---|---|---|
| 5,636,243 A * | 6/1997 | Tanaka ....................... 375/219 |
| 5,714,961 A * | 2/1998 | Kot et al. .................... 343/769 |
| 5,737,325 A * | 4/1998 | Fukuda ....................... 370/337 |
| 5,781,860 A * | 7/1998 | Lopponen et al. ........ 455/426.1 |
| 5,790,938 A * | 8/1998 | Talarmo ..................... 455/11.1 |
| 5,842,130 A * | 11/1998 | Oprescu-Surcobe et al. ........................ 455/456.2 |
| 5,907,794 A * | 5/1999 | Lehmusto et al. ......... 455/11.1 |
| 5,995,500 A * | 11/1999 | Ma et al. .................... 370/337 |
| 6,115,370 A * | 9/2000 | Struhsaker et al. ......... 370/342 |
| 6,137,785 A * | 10/2000 | Bar-Ness .................... 370/328 |
| 6,188,913 B1 * | 2/2001 | Fukagawa et al. ........ 455/562.1 |
| 6,246,376 B1 * | 6/2001 | Bork et al. .................. 343/760 |
| 6,289,218 B1 * | 9/2001 | Liu .......................... 455/426.1 |
| 6,370,377 B1 * | 4/2002 | Take et al. ................ 455/432.1 |
| 6,456,856 B1 * | 9/2002 | Werling et al. ........... 455/575.5 |
| 6,480,699 B1 * | 11/2002 | Lovoi ........................ 455/41.2 |
| 6,484,027 B1 * | 11/2002 | Mauney et al. ............. 455/421 |
| 6,654,614 B1 * | 11/2003 | Morris et al. ............ 455/426.1 |
| 2001/0051530 A1 * | 12/2001 | Shiotsu et al. .............. 455/522 |

FOREIGN PATENT DOCUMENTS

| | | | |
|---|---|---|---|
| JP | 9-186649 | | 7/1997 |
| JP | 2002271229 A | * | 9/2002 |
| WO | WO94/05101 | * | 8/1992 |

OTHER PUBLICATIONS

Copy of U.S. Patent Appl. No. 09/694,793, filed Oct. 24, 2000, to Ito.

* cited by examiner

*Primary Examiner*—Charles Craver
(74) *Attorney, Agent, or Firm*—Finnegan, Henderson, Farabow, Garrett & Dunner, LLP.

(57) ABSTRACT

A communication apparatus transmits, to another apparatus or apparatuses, a message for searching for an apparatus as a connection target by radio communication, and receives a response message from another apparatus which has received the message, thereby searching for an apparatus as a connection target. The control information setting section of the device body of a communication apparatus inputs a search range in which a station finding message reaches in accordance with designation by a user and sets it as set information. The station finding procedure section of the radio communication apparatus transmits the station finding message in accordance with a transmission power corresponding to the control information set by the control information setting section.

23 Claims, 10 Drawing Sheets

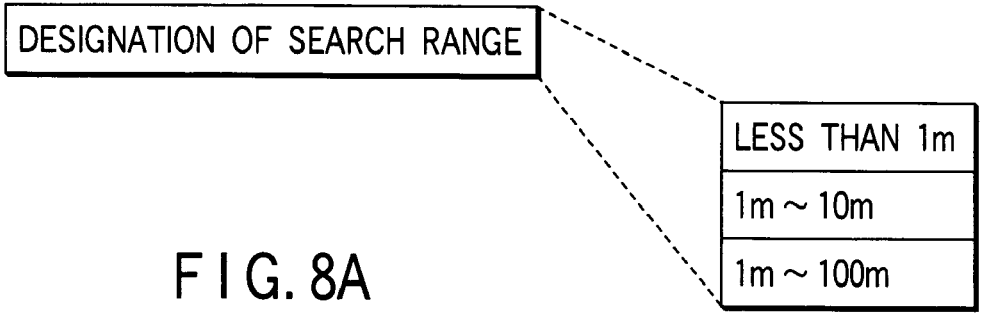
F I G. 8A
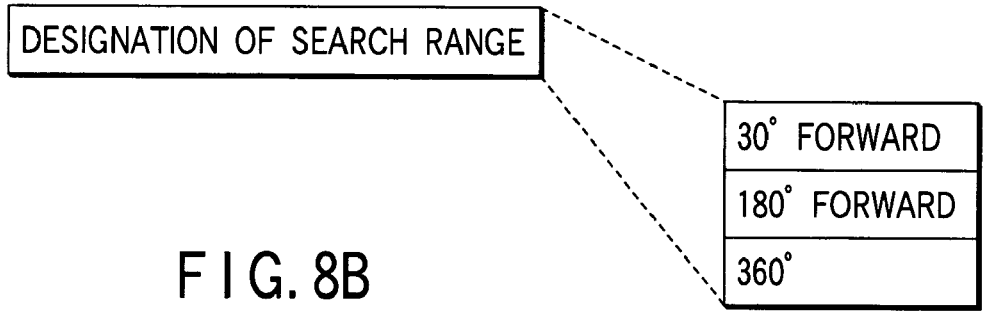
F I G. 8B
| SEARCH RANGE | TRANSMISSION POWER |
|---|---|
| 1m | 1mW |
| 1 ~ 10m | 10mW |
| 10 ~ 100 | 100mW |
F I G. 9

| TRANSMISSION POWER VALUE | STATION FINDING PROCEDURE TIME |
|---|---|
| 10mW | 1SECOND |
| 100mW | 5SECOND |
| 1W | 10SECOND |

FIG. 14

| DEVICE NUMBER | DEVICE ADDRESS |
|---|---|
| 1 | A39B31 |
| 2 | 244A15 |
| ... | ... |

FIG. 16A

| DEVICE NUMBER | DEVICE CLASSIFICATION | DEVICE NAME |
|---|---|---|
| 1 | PC | LUNA |
| 2 | PRINTER | APOLON |
| ... | ... | ... |

FIG. 16B

COMMUNICATION SYSTEM, COMMUNICATION APPARATUS, AND COMMUNICATION METHOD

CROSS-REFERENCE TO RELATED APPLICATIONS

This application is based upon and claims the benefit of priority from the prior Japanese Patent Application No. 11-328327, filed Nov. 18, 1999, the entire contents of which are incorporated herein by reference.

BACKGROUND OF THE INVENTION

The present invention relates to a communication system having a main station and at least one subsidiary station, and a communication apparatus and method used in the system.

Recently, a great deal of attention has been paid to radio communication systems for personal areas, e.g., IrDA, Bluetooth, HomeRF systems. The Bluetooth and HomeRF systems, in particular, use RF signals, and hence have merits, e.g., no directivity and high transparency, as compared with infrared communication schemes such as the IrDA system. Therefore, further development and popularization of the Bluetooth and HomeRF systems are greatly expected.

Such a radio communication system allows simultaneous connection of a plurality of devices. In addition, one of the noticeable characteristic features of this system is that the transmission distance is relatively long (10 to 100 m). For this reason, in the Bluetooth or HomeRF system, when devices are to be actually connected to each other, there is no need to face them each other, unlike a communication system with a high directivity, e.g., the IrDA system, in which devices must be faced each other to specify the partner devices. In the case of Bluetooth, HomeRF, or the like, a station finding message is transmitted as a broadcast message from the main station, and response messages from subsidiary stations which have received the station finding message are received by the main station, thereby searching for a device that can communicate.

When Bluetooth, HomeRF, or the like is used, although the lack of directivity facilitates handling, since the station finding message is transmitted to all devices in a search range, response messages from devices other than target devices are received. As a consequence, a long time is spent to find a station. In addition, in general, all pieces of information received from devices in the search range must be displayed on a display means such as a display to notify a user of the information. Consequently, many pieces of information from stations other than stations that need to communicate are displayed. This makes it difficult for the user to perform a subsequent procedure for designating a destination station on the basis of the displayed information.

The present invention has been made in consideration of the above situation, and has as its object to provide a communication system and communication apparatus and method which can efficiently perform a station finding procedure in a short period of time by changing the reachable range of a station finding message in searching for a station as a connection target, efficiently perform designation of a station thereafter, and are easy for a user to use.

BRIEF SUMMARY OF THE INVENTION

According to the present invention, there is provided a communication apparatus for transmitting, to another apparatus, a message for searching for an apparatus as a connection target by radio communication, and receiving a response message from another apparatus which has received the message, thereby searching for an apparatus as a connection target, comprising means for setting a range in which the message can reach, and means for transmitting the message in accordance with the set range by the setting means.

According to this arrangement, when another apparatus as a connection target is located near the self-apparatus, the reachable range of the message for searching for an apparatus as a connection target is narrowed to save the processing performed between the self-apparatus and other apparatuses that need not be connected, thereby efficiently performing a station finding procedure in a short period of time.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 8A and 8B are views each showing an example of a field configuration in which choices for designation of a search range are presented;

FIG. 9 is a view showing the relationship between each distance as a search range and a corresponding transmission power for transmission of the station finding message from a radio communication apparatus 19;

FIG. 14 is a view showing an example of a table which links station finding procedure time choices to transmission power values prepared in advance;

FIGS. 16A and 16B are views each showing an example of display of station finding information.

DETAILED DESCRIPTION OF THE INVENTION

Figure 1:
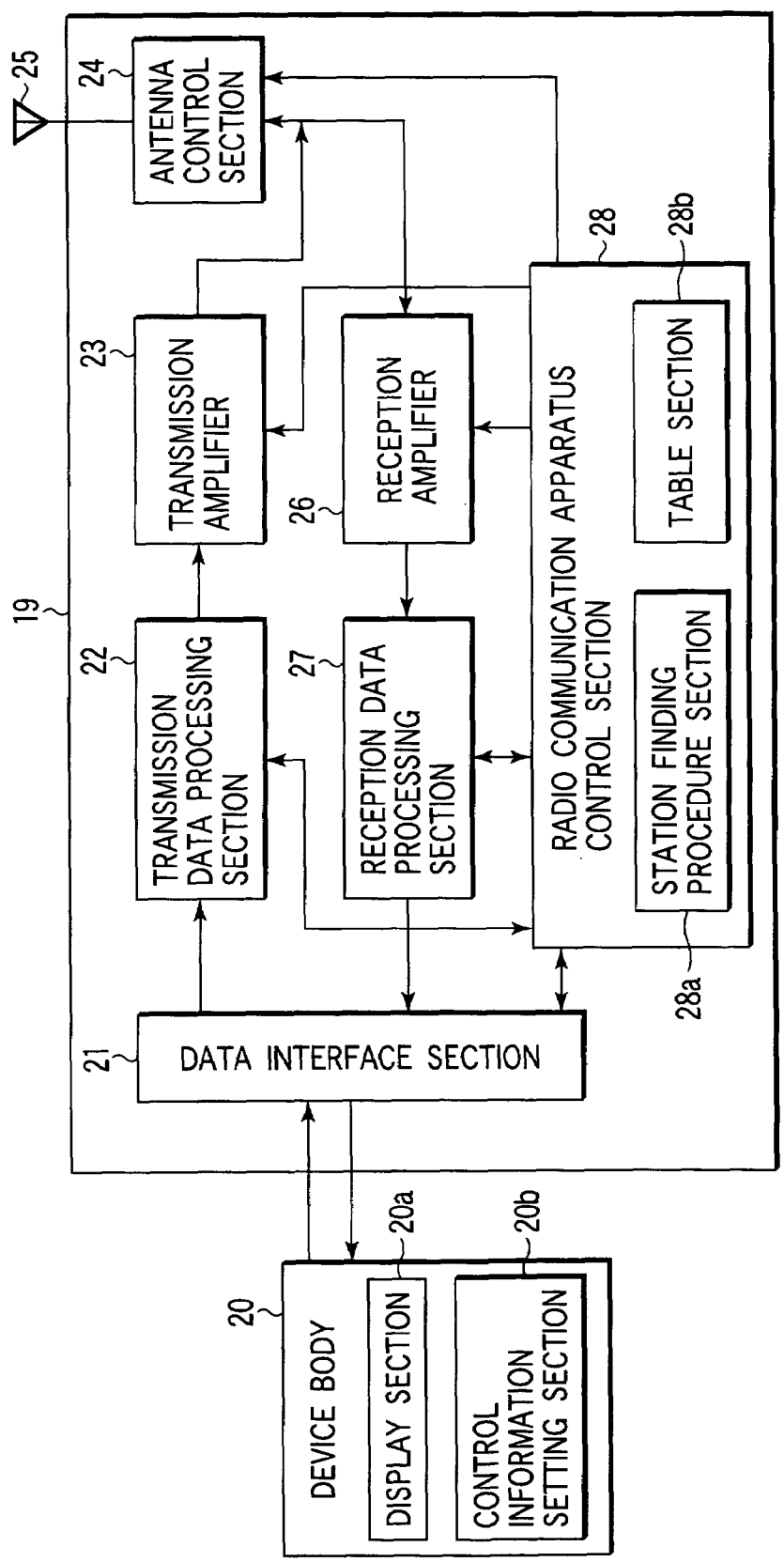
FIG. 1 is a block diagram showing the arrangement of a device used in a communication system according to this embodiment.

An embodiment of the present invention will be described below with reference to the views of the accompanying drawing. FIG. 1 is a block diagram showing the arrangement of a device used in a communication system according to this embodiment.

The communication system of this embodiment is formed such that a device functioning as a single main station (master) and at least one device functioning as a subsidiary station (slave) communicate with each other by radio. The communication system forms a radio network by using a plurality of radio communication apparatus mounted in the respective devices. FIG. 1 shows the arrangement of the device functioning as the main station.

As shown in FIG. 1, each device in this embodiment has a radio communication apparatus 19 for performing radio communication and a device body 20. The radio communication apparatus 19 is mounted and used in various types of information processing devices (personal computers and the like), communication devices, and the like. For example, the radio communication apparatus 19 performs radio communication by using the Bluetooth or HomeRF scheme.

Bluetooth and HomeRF are short-range radio communication standards. By using a 2.4-GHz ISM (Industry Science Medical) band, Bluetooth and HomeRF implement radio communication within 10 m and 50 m, respectively.

Bluetooth and HomeRF use a frequency hopping scheme as a spread spectrum technique. By using time-division multiplexing, in Bluetooth, it is possible to connect a maximum of eight devices; HomeRF, a maximum of 127 devices.

According to Bluetooth or HomeRF, a network is formed by using devices connected to each other by time-division multiplexing, with one device functioning as a main station (first device) and the remaining devices functioning as subsidiary stations (second devices). This network has the function of performing connection authentication by using a password called a PIN (Personal Identification Number) code.

The radio communication apparatus 19 has a data interface section 21, transmission data processing section 22, transmission amplifier 23, antenna control section 24, antenna 25, reception amplifier 26, reception data processing section 27, and radio communication apparatus control section 28. After a device (radio communication apparatus) serving as a target subsidiary station is detected by station finding processing (transmission of a station finding message and reception of a response message), the radio communication apparatus 19 executes basic data transmission/reception processing between the respective devices as follows.

In data transmission, the radio communication apparatus 19 converts transmission data received from the device body 20 through the data interface section 21 into an RF signal by using the transmission data processing section 22. The apparatus 19 then amplifies the RF signal by using the transmission amplifier 23 and radiates the signal from the antenna 25 through the antenna control section 24 (to be described in detail later with reference to FIG. 2).

In data reception, the reception amplifier 26 amplifies an RF signal received by the antenna 25 and obtained through the antenna control section 24, and demodulates the RF signal by using the reception amplifier 26, thereby reconstructing the reception data. The apparatus 19 then outputs the data from the data interface section 21 to the device body 20.

The reception amplifier 26 executes data processing for the reception data amplified by the reception amplifier 26 and having an effective level upon checking identification information (ID) or the like for identifying the data transmission source device.

The radio communication apparatus control section 28 implements the above data transmission/reception by controlling the respective sections, and has a station finding procedure section 28a and table section 28b. The station finding procedure section 28a controls the transmission data processing section 22, transmission amplifier 23 and antenna control section 24 so as to transmit a station finding message as a broadcast message, and to receive a response message from a subsidiary station which has received the station finding message, thereby searching for a device that can communicate. The radio communication apparatus control section 28 has the function of changing the transmission power value by controlling the transmission amplifier 23 or changing the antenna directivity by controlling the antenna control section 24 in accordance with the control information set by a control information setting section 20b of the device body 20.

The finding processing is executed on the basis of the control information set by the control information setting section 20b, thereby a device (subsidiary station) desired by a user can be efficiently searched out. In the reception data processing section 27, the control information set by the control information setting section 20b of the device body 20 is registered. The station finding procedure section 28a refers to this information.

The device body 20 has the functions of a display section 20a and the control information setting section 20b.

The device body 20 is comprised of the main components of an information processing device or the like, i.e., a processor, memory, storage unit, display unit, input unit, and the like. For example, the device body 20 is implemented by a computer designed to load a program recorded on a recording medium such as a CD-ROM, DVD, or magnetic disk and be controlled by the program.

The display section 20a displays information (station finding information) about a device as a subsidiary station searched out by the radio communication apparatus 19 (station finding procedure section 28a).

The control information setting section 20b sets control information that is used to efficiently search for a device (subsidiary station) desired by the user according to the station finding processing executed by the radio communication apparatus 19 (station finding procedure section 28a). In this embodiment, the control information setting section 20b can set a transmission power value, antenna directivity, and station finding procedure time as control information in accordance with an instruction from the user (to be described in detail later).

Figure 2:
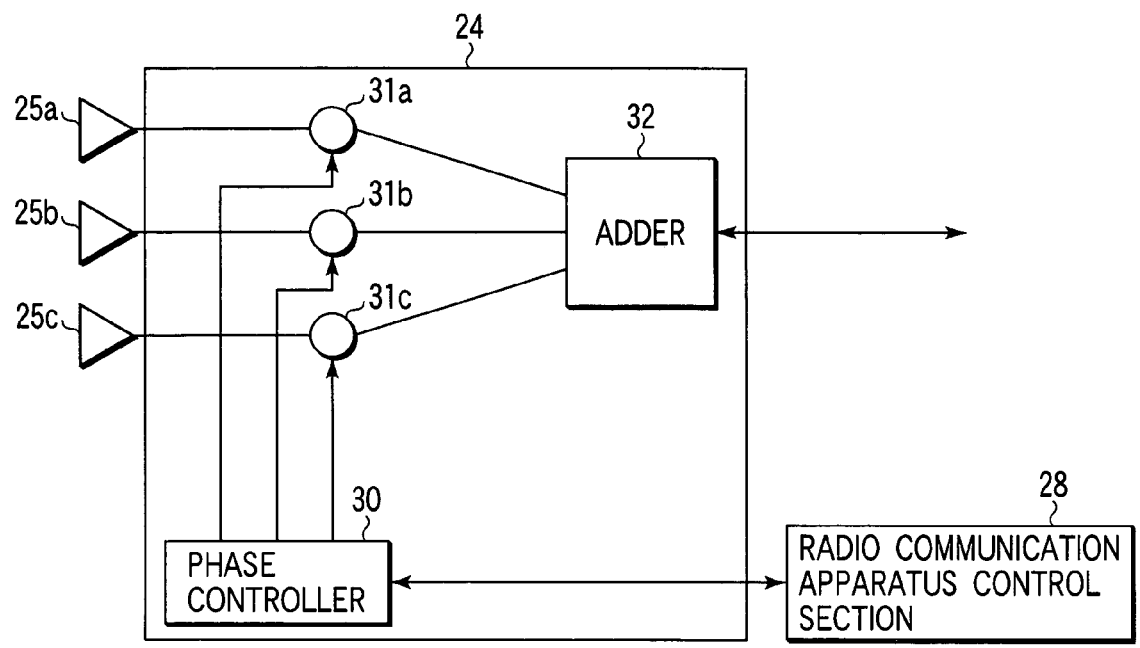
FIG. 2 is a block diagram showing the detailed arrangements of an antenna control section 24 and antenna 25.

FIG. 2 is a block diagram showing the detailed arrangements of the antenna control section 24 and antenna 25.

The antenna control section 24 has the function of changing the antenna directivity under the control of the radio communication apparatus control section 28, and implements a change in directivity by using an adaptive array antenna. By changing the antenna directivity, the direction in which a station finding message is to be transmitted can be specified. This makes it possible to limit the reachable range of the station finding message.

In the case shown in FIG. 2, a phase controller 30, which operates under the control of the radio communication apparatus control section 28, sets the phases of phase shifters 31a, 31b, and 31c corresponding to three antenna elements 25a, 25b, and 25c to change the radiation characteristics (directivity).

The phase shifters 31a, 31b, and 31c corresponding to the antenna elements 25a, 25b, and 25c are connected to the transmission amplifier 23 and reception amplifier 26 through an adder 32. The arrangement shown in FIG. 2 includes the three antenna elements 25a, 25b, and 25c. However, the number of antenna elements is not limited to three, and an antenna directivity can be produced as long as a plurality of antenna elements are used.

The basic operation of the communication system of this embodiment will be described first.

As described above, the radio communication apparatus 19 executes radio communication by using, for example, the Bluetooth or HomeRF technique. The Bluetooth and HomeRF techniques and the like use SS (Spread Spectrum) techniques to effectively use limited bands. Of the SS techniques, FH-TDD (Frequency Hopping-Time Division Duplex) (this scheme is the same as that used in Bluetooth) is used.

Figure 3:
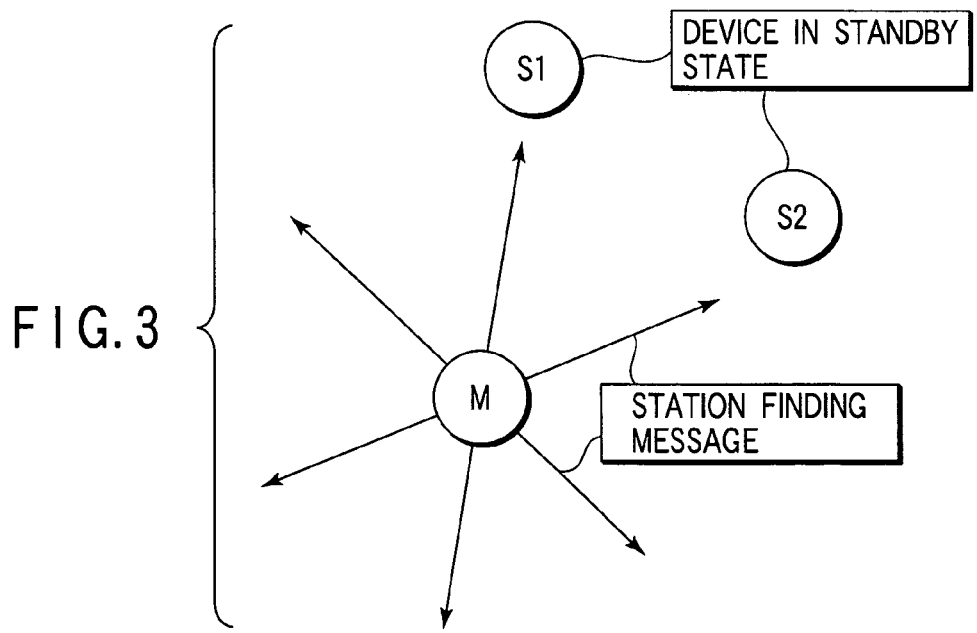
FIG. 3 is a view showing how a station finding procedure is performed.
Figure 4:
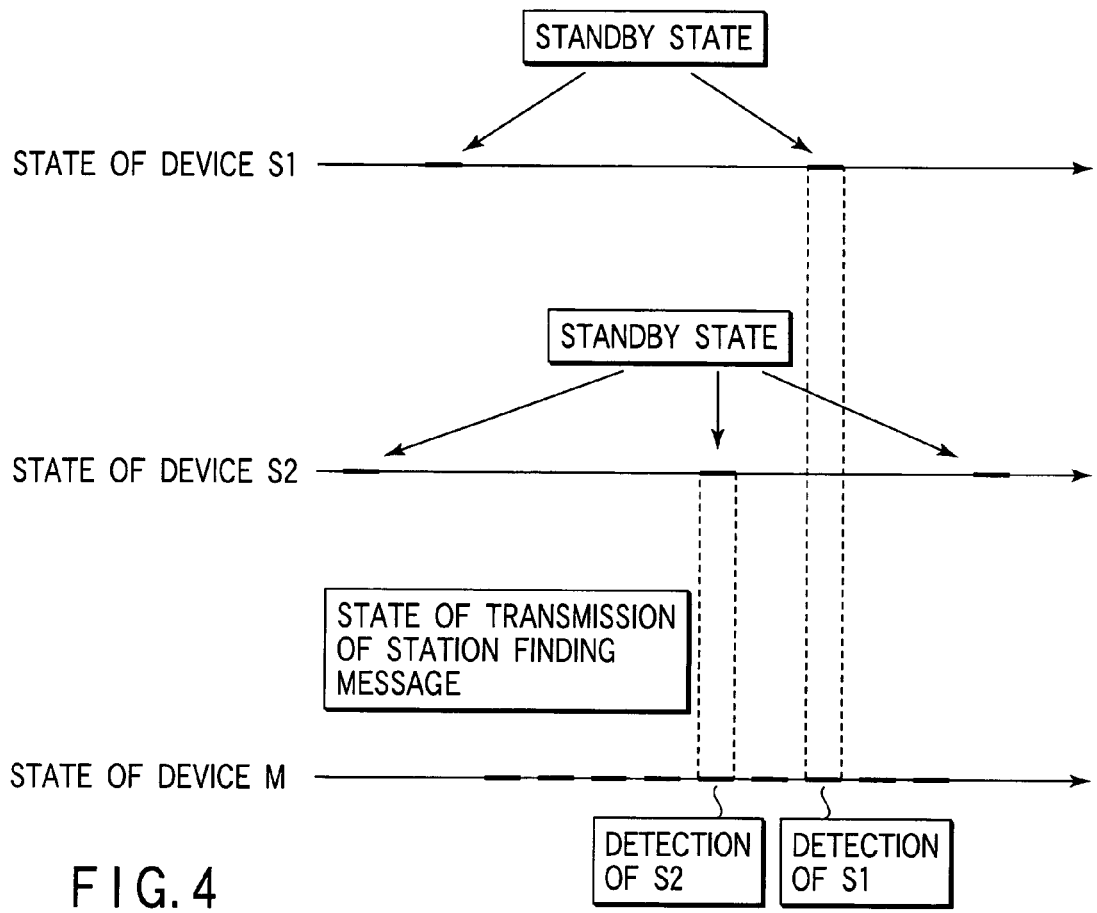
FIG. 4 is a view showing how the station finding procedure is performed.

FIGS. 3 and 4 show a state wherein a station finding procedure is executed.

In general, when a station finding message is to be issued, the unique ID (unique address) of a device as a connection target is unknown. For this reason, as shown in FIG. 3, the main station M transmits a station finding message as a broadcast message that is independent of a device ID.

In this case, as shown in FIG. 4, the main station consecutively transmits the station finding message while changing the frequency channel at predetermined intervals in accordance with a proper frequency hopping sequence so as to cover all the frequency channels. In this case, since the main station does not obtain information about standby intervals in subsidiary stations, the main station generally transmits the station finding message for a relatively long period of time.

Devices (subsidiary stations S1 and S2) in the standby state monitor this broadcast message while periodically changing standby frequencies in accordance with proper frequency hopping sequences (set in the standby state).

In this state, when the transmission frequency from the main station coincides with the standby frequency at a subsidiary station, the subsidiary station can receive the station finding message from the main station and return a response message in response to the received message.

The response message includes information about the unique ID of the station. This allows the main station to designate the unique subsidiary station (specific device) in the following processing. After the overall station finding procedure is completed, the main station obtains the pieces of unique ID information of all the subsidiary stations set in the standby state within the search range.

Figure 5:
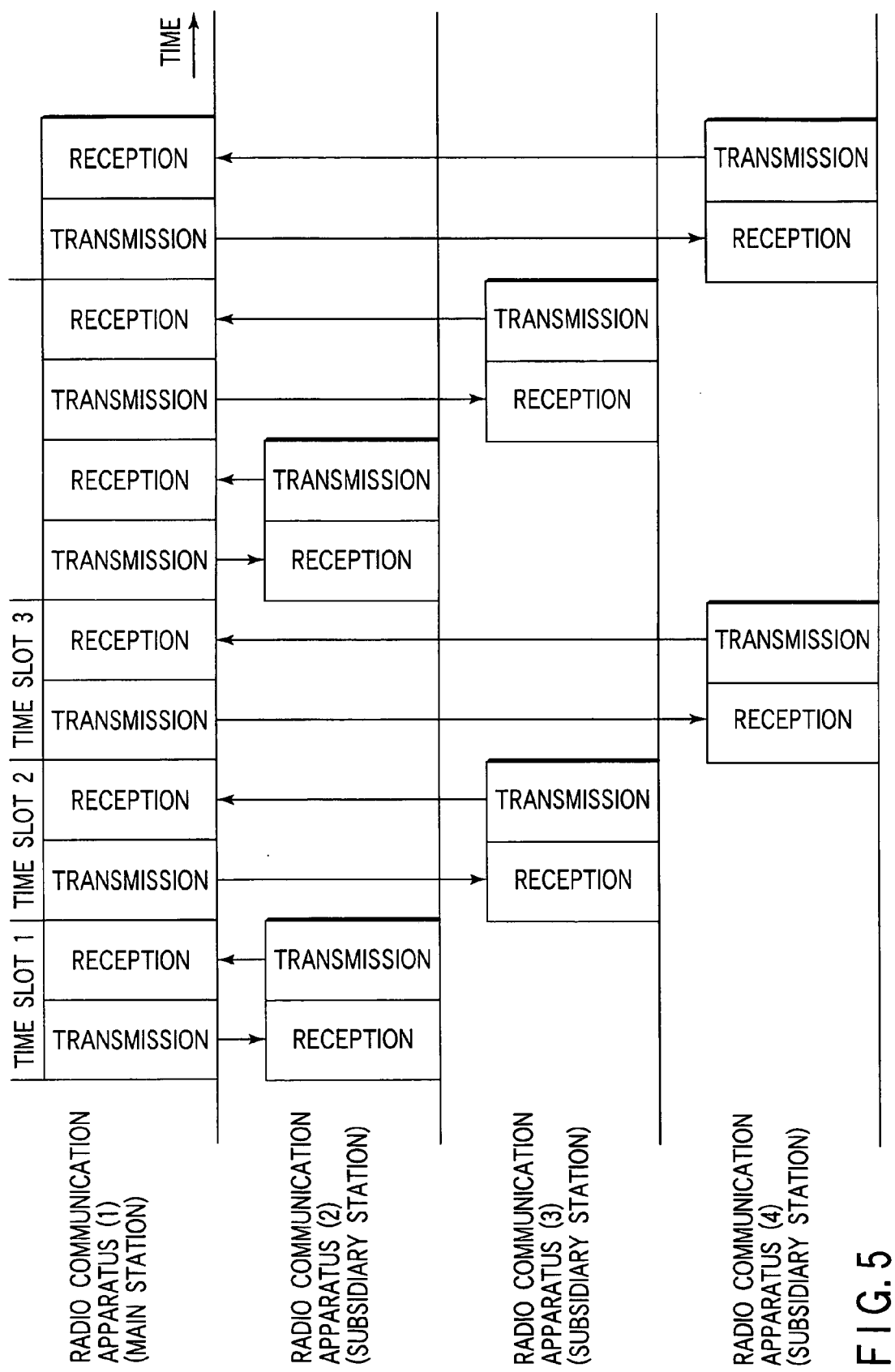
FIG. 5 is a timing chart showing the timing of data transmission/reception in a case wherein a main station and a plurality of subsidiary stations are searched.

The data transmission/reception timing in a case wherein the main station and a plurality of subsidiary stations are searched will be described next with reference to the timing chart of FIG. 5. Referring to FIG. 5, a radio communication apparatus (1) is mounted in a device serving as a main station, and radio communication apparatuses (2), (3), and (4) are mounted in devices serving as subsidiary stations.

The radio communication apparatus control section 28 of each device holds network information, and determines the timing of data transmission/reception in the radio network on the basis of this network information. In the case of the main station, network information indicates the IDs of all the subsidiary stations in the network and the transmission/reception timing with respect to each subsidiary station. In the case of each subsidiary station, network information indicates the ID of the main station in the network and the transmission/reception timing with respect to the main station.

As shown in FIG. 5, data communication is performed between the main station and the subsidiary stations by time-division multiplexing. More specifically, in time slot 1, the radio communication apparatus (1) serving as the main station transmits/receives data to/from the radio communication apparatus (2) on a one-to-one basis. In time slot 2, the radio communication apparatus (1) transmits/receive data to/from the radio communication apparatus (3) in a one-to-one basis. In time slot 3, the radio communication apparatus (1) transmits/receives data to/from the radio communication apparatus (4) on a one-to-one basis. Likewise, the radio communication apparatus (1) executes data transmission/reception while changing the target radio communication apparatus in units of time slots.

Consider a case wherein a device (subsidiary station) that is designated as a connection target by the user is located at a relatively short distance from the user (main station). Assume that in an office environment, a PC on a desk and a PDA (Personal Digital Assistant) used by the user at the desk are to be connected to each other by radio, and the PC need not be connected to other devices for a while.

Figure 6:
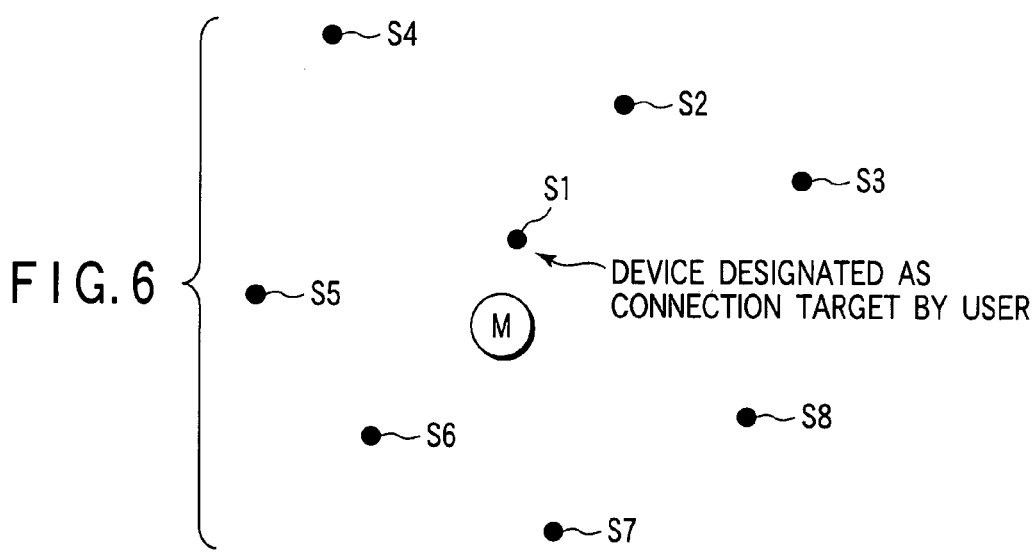
FIG. 6 is a view for explaining the positional relationship between an apparatus (subsidiary station) designated as a connection target by the user and the user (main station)

Assume that in FIG. 6, the PC is a main station M, and the PDA is a subsidiary station S1 desired as a connection target by the user. Assume also that the main station M need not be connected to nearby subsidiary stations S2 to S8.

In general, if the subsidiary stations S1 to S8 exist within the reachable range of the station finding message transmitted from the main station M (PC), these stations become search targets, as described above. In this embodiment, however, only a subsidiary station located near the main station M1 or in a specific direction can be designated as a search target by limiting a search range (the reachable range of the station finding message) by setting control information for limiting the search range in advance.

Figure 7:
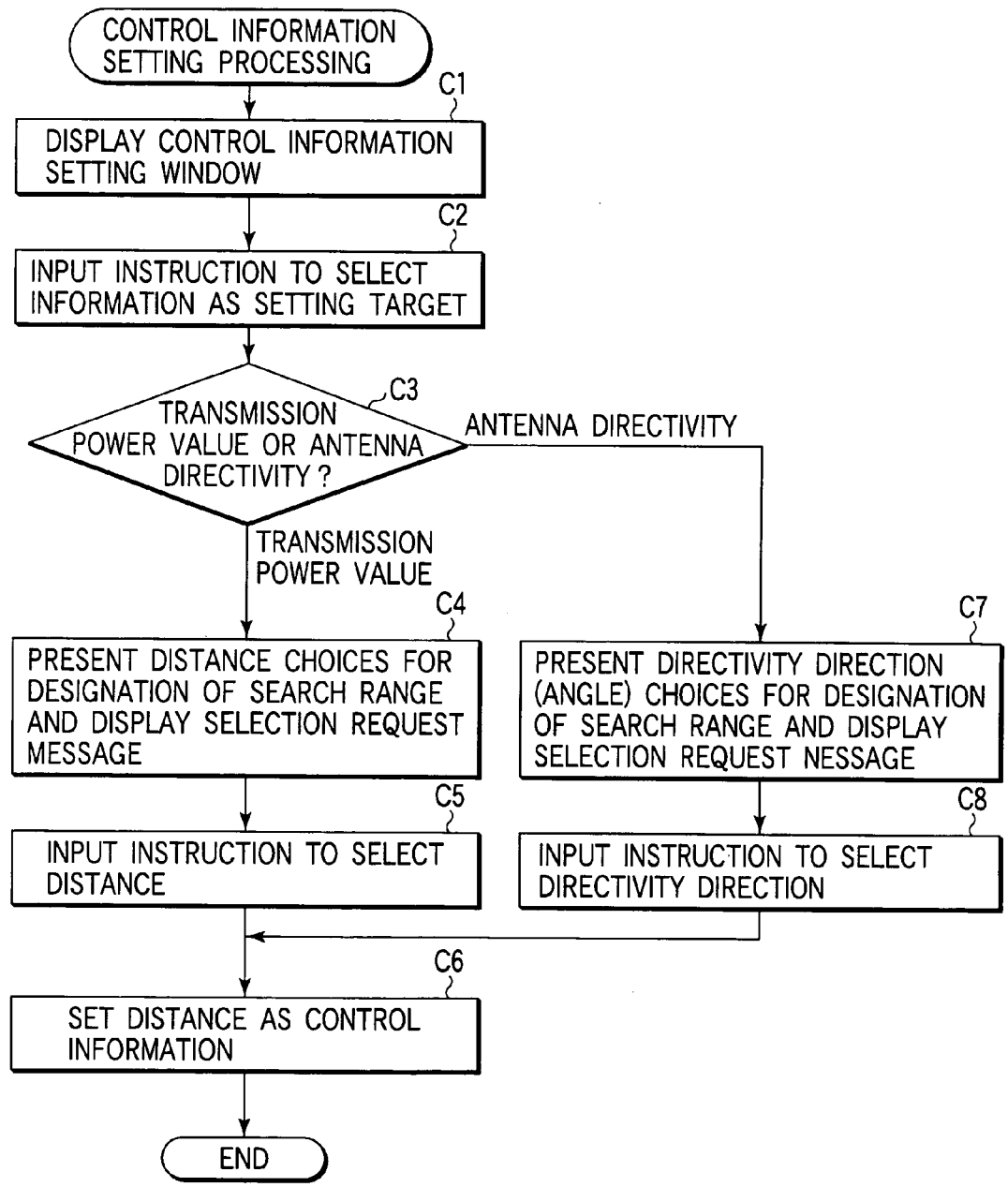
FIG. 7 is a flow chart showing control information setting processing for setting control information.

Control information setting processing for setting control information will be described next with referenced to the flow chart of FIG. 7.

Control information setting processing is executed by the device body 20 of the device such as a PC serving as a main station. When the user generates a request to execute control information setting processing, the device body 20 starts the control information setting section 20b to display a control information setting window on the display unit (step C1).

In the control information setting window, for example, an instruction to select information to be set (step C2). In this embodiment, as control information to be set, for example, a transmission power value and antenna directivity can be arbitrarily designated.

In this case, if a request to set a transmission power value is generated (step C3), the control information setting section 20b displays, for example, the message "Designate a distance as a search range", together with distance choices (selection fields) for the designation of a search range (step C4).

FIG. 8A shows an example of field configuration in which choices for transmission power control are presented. In the case shown in FIG. 8A, as a search range, a distance can be selected from "less than 1 m", "1 to 10 m", and "10 to 100 m".

For example, as shown in FIG. 9, the respective distances as search ranges are set in advance to correspond to the transmission powers required to transmit the station finding message from the radio communication apparatus 19. Assume that the data shown in FIG. 9 are set in the device body 20 in advance.

In the case shown in FIG. 9, if "less than 1 m" is selected as a search range, the station finding message is transmitted with a transmission power of "1 mW". Likewise, a transmission power of "10 mW" is set for the search range "1 to 10 m", and a transmission power of "100 W" is set for the search range of "10 to 100 m".

When, therefore, a device (e.g., a PDA) serving as a subsidiary station is to be connected to a device (e.g., a PC) serving as a main station, the reachable range of a station finding message is limited by designating a search range in accordance with the installation position of the device serving as a subsidiary station, thereby preventing the station finding message from being sent to devices that need not be connected.

In this case, if an instruction to select a distance as a search range from choices is input (step C5), the control information setting section 20b sets a transmission power as control information in accordance with a relationship with search ranges like those shown in FIG. 9 (step C6).

If a request to set an antenna directivity is received in step C3, the control information setting section 20b displays the message "Designate a directivity direction as a search range", together with directivity direction (angle) choices (selection fields) in which the station finding message for designating a search range is to be transmitted (step C4).

FIG. 8B shows an example of a field configuration in which choices for antenna directivity control are presented. In the case shown in FIG. 8B, as a directivity direction, an angle can be selected from "30° forward", "180° forward", and "360°".

For the respective directivity directions, data are prepared in advance in the antenna control section 24 of the radio communication apparatus 19 to allow the phase controller 30 to set the phase shifters 31a, 31b, and 31c in accordance with a directivity direction.

When, therefore, a device (e.g., a PDA) serving as a subsidiary station is to be connected to a device (e.g., a PC) serving as a main station, the reachable range (angle) of a station finding message is limited by designating a directivity direction range in accordance with the installation direction of the device serving as a subsidiary station, thereby preventing the station finding message from being sent to devices that need not be connected.

In this case, if an instruction to select a directivity direction as a search range from choices is input (step C8), the control information setting section 20b sets data for setting the phase shifters 31a, 31b, and 31c as control information in accordance with the selected directivity direction (step C6).

The control information set by the control information setting section 20b in this manner is transmitted to the radio communication apparatus 19 and registered in the table section 28b of the radio communication apparatus control section 28 through the data interface section 21.

According to the above description, control information is obtained by the control information setting section 20b of the device body 20 in accordance with the search range (distance and directivity direction) designated by the user, and transmitted to the radio communication apparatus 19 (radio communication apparatus control section 28). However, the control information setting section 20b may transmit only data representing the search range designated by the user to the radio communication apparatus control section 28, and the radio communication apparatus control section 28 may convert the data into control information in accordance with the specifications of said self-apparatus (the performance of the transmission amplifier 23 and the number of phase shifters provided for the antenna control section 24) and register the information in the table section 28b.

Station finding processing based on the control information set by control information setting processing will be described next with reference to the flow charts of FIGS. 10 and 11.

Figure 10:
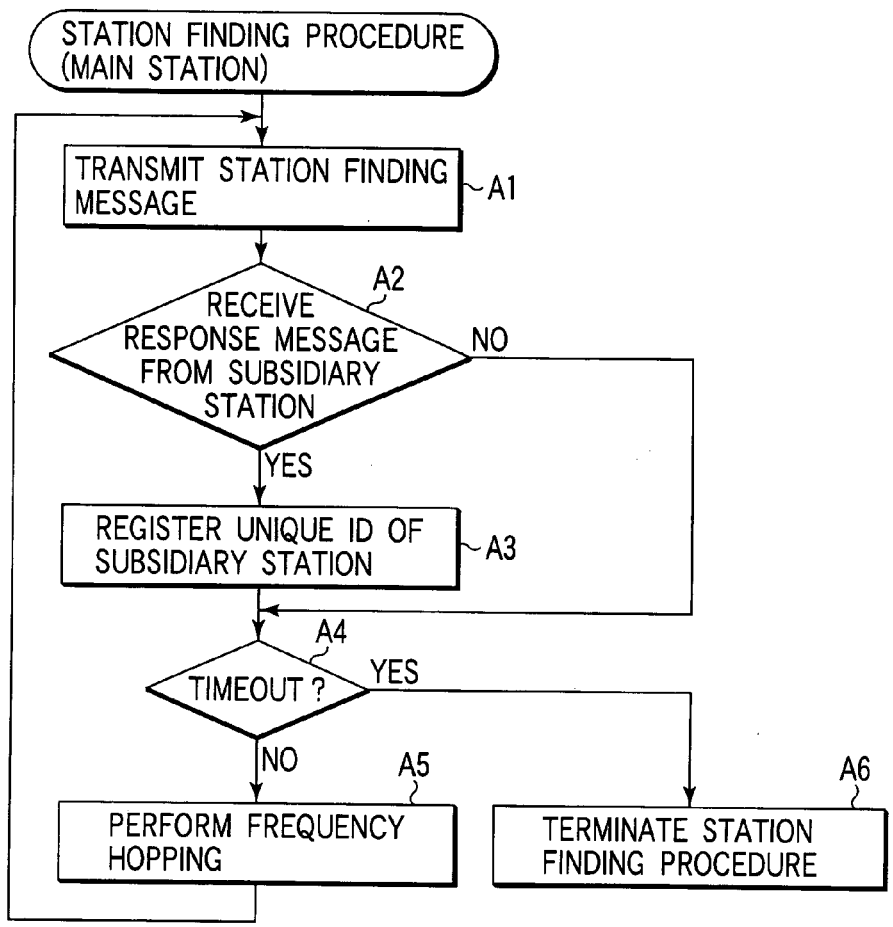
FIG. 10 is a flow chart showing a station finding procedure in the main station on the basis of the control information set by control information setting processing.

FIG. 10 is a flow chart showing station finding processing in the main station. FIG. 11 is a flow chart showing station finding processing in a subsidiary station (see FIG. 4 for the timing of the operation of the main station and subsidiary station).

If an instruction to execute station finding processing is received, the station finding procedure section 28a starts the station finding processing. First of all, the station finding procedure section 28a transmits the unique station finding message set in advance by control operation corresponding to the control information registered in the table section 28b (step A1 in FIG. 10). That is, the station finding procedure section 28a causes the transmission data processing section 22 to transmit the station finding message through the transmission amplifier 23 and antenna control section 24.

If, for example, control information for controlling transmission power is set in the table section 28b, the station finding procedure section 28a controls (amplifies) the transmission amplifier 23 to set the transmission power represented by the control information, thus transmitting the station finding message.

If control information for controlling the directivity direction is set in the table section 28b, the station finding procedure section 28a causes the phase controller 30 of the antenna control section 24 to set the phases of the phase shifters 31a, 31b, and 31c to set the designated directivity direction, thereby producing the directivity of the antenna 25.

The station finding message under control corresponding to control information in this manner is transmitted, thereby connection targets can be limited to only the devices (subsidiary stations) that are present in the search range designated by the user.

Figure 11:
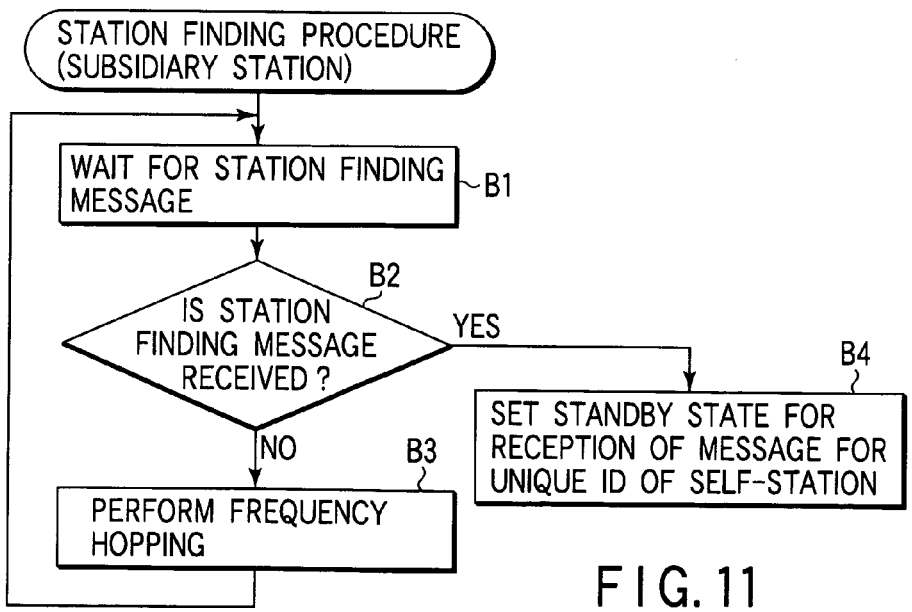
FIG. 11 is a flow chart showing a station finding procedure in a subsidiary station on the basis of the control information set by control information setting processing.

Each subsidiary station in the standby state is monitoring the station finding message at predetermined intervals (step B1 in FIG. 11). If the station finding message is not received (step B2), the subsidiary station changes the standby frequency (frequency hopping), and the flow returns to the first step (step B3).

If the station finding message is received in the standby state (step B2), the subsidiary station transmits a response message including the unique ID information of the self-station in response to the station finding message, and is set in the standby state to wait for the message addressed to the unique ID of the self-station (step B4).

Upon reception of the response message from the subsidiary station for the station finding message (step A2 in FIG. 10), the reception data processing section 27 of the main station identifies the unique ID information included in the response message, and internally registers the unique ID information of the subsidiary station as information representing the subsidiary station as a communication target.

The main station checks whether a timer value associated with the station finding message transmission time indicates a timeout, regardless of whether a response message is received from the subsidiary station (step A4).

If the timer value does not indicate a timeout, the main station changes the frequency channel by frequency hopping in accordance with a proper frequency hopping sequence (step A5), and the flow returns to the first step to transmit the station finding message (step A1). If the timer value indicates a timeout, the station finding procedure is terminated (step A6).

As the above timer value, if a sufficient time for a search for subsidiary stations existing around the main station is ensured, which is not excessively long. The user may change the timeout period as a timer value in accordance with the search range designated by the user. If, for example, the search range is changed from "1 to 10 m", to "less than 1 m" upon designation, the timeout period as a timer value may be shortened.

Figure 12:
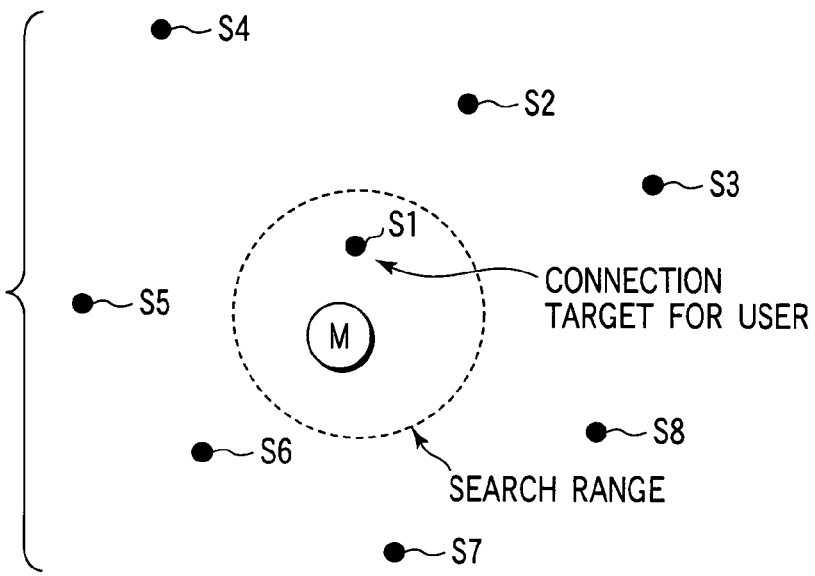
FIG. 12 is a view for explaining how the search range is changed by a station finding procedure based on control information (when transmission power control is performed)
Figure 13:
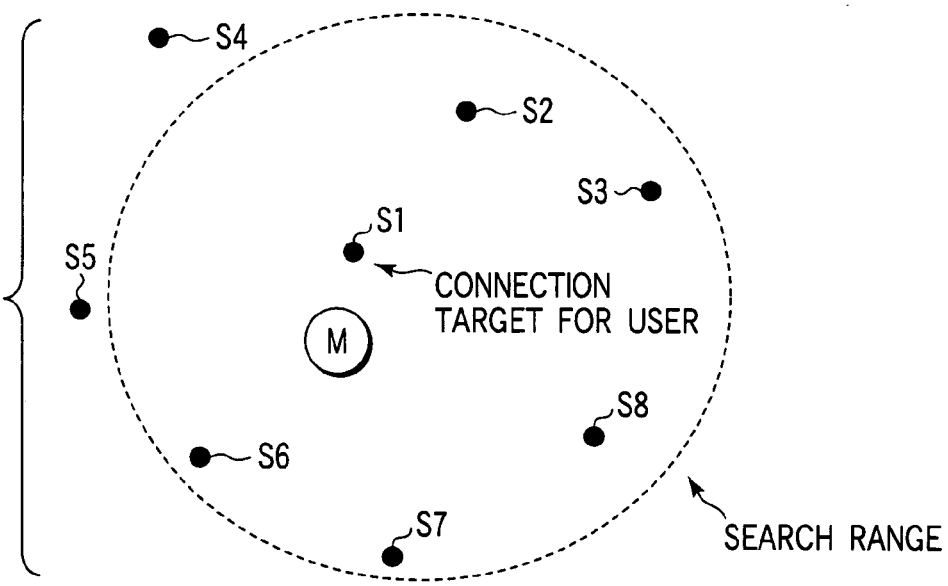
FIG. 13 is a view for explaining how the search range is changed by a station finding procedure based on control information (when transmission power control is not performed)

FIGS. 12 and 13 show how the search range changes by station finding processing based on control information like that described above. FIGS. 12 and 13 show a case wherein the user designates the distance from the main station as a search range, and transmission power control for the station finding message is performed.

As shown in FIGS. 12 and 13, the plurality of subsidiary stations S1 to S8 are present around the main station M. Of the plurality of subsidiary stations S1 to S8, the subsidiary station S1 nearest to the main station M is a subsidiary station designated as a connection target by the user.

In such a state, as shown in FIG. 12, the search range can be limited by designating a short distance from the main station M so as to include only the subsidiary station S1, thereby setting the subsidiary stations S2 to S8 outside the search range.

If no control information is set and no transmission power control is performed, the search range shown in FIG. 13 is set. In the case shown in FIG. 13, subsidiary stations other than the subsidiary stations S4 and S5 are included in the search range.

The main station M therefore receives response messages from many subsidiary stations for the transmitted station finding message. For this reason, the main station M must specify one of the subsidiary stations which have returned the response messages as a connection target.

In contrast to this, if the search range is limited as shown in FIG. 12, the station finding message transmitted from the main station M is received by only the subsidiary station S1. Consequently, the main station M receives the response message from only the subsidiary station S1. This makes it possible to simplify specification of a subsidiary station as a connection target and prevent an excessively long period of time from being spent to find a station.

In the case shown in FIGS. 12 and 13, transmission power control is performed. If, however, antenna directivity control is to be performed, the search range is set to include only a subsidiary station existing within a specific range from the main station.

If, for example, the user designates "30° forward" as a search range, only the subsidiary station S1 becomes a search target as a subsidiary station that exists at a position corresponding to "30° forward" with respect to the main station M. The main station M can therefore receive a response message from only the subsidiary station S1 for the station finding message.

Setting control information in advance by using the control information setting section 20b in accordance with the search range (distance and directivity direction) designated by the user makes it possible to limit the reachable range of the station finding message which is transmitted from the radio communication apparatus 19 mounted in the device serving as the main station to search for a subsidiary station as a connection target.

Subsidiary stations that need not be connected can therefore be excluded in advance. When, for example, a device (PC) which is placed on a table and serves as a main station and a nearby device (PDA) are to be connected to each other, if the search range is narrowed in advance, the main station can be connected to the device (PDA) desired by the user, and other devices that need not be connected are excluded from the station finding procedure, thus preventing an excessively long period of time from being spent to find a station.

When a subsidiary station to be connected is selected from a plurality of subsidiary stations that have been searched out, since subsidiary stations that need not be connected are excluded in advance, the user can easily select a subsidiary station serving as a connection target, thus improving operability.

In addition, as the transmission power used to transmit the station finding message can be minimized, a reduction in power consumption can be attained.

According to the above description, the search range is limited in accordance with the distance from the main station or antenna directivity designated by the user. However, the search range can be determined in the following manner.

In searching for a subsidiary station as a connection target by station finding processing, the station finding message is transmitted, and a corresponding response message is received to acquire information (e.g., the unique ID information) of the subsidiary station.

The station finding procedure (protocol) needs to be variously operated to prevent collision between response messages returned from a plurality of subsidiary stations upon transmission of a station finding message to all subsidiary stations existing in the search range.

In general, as the search range extends, the number of subsidiary stations included in the search range increases. As a consequence, a longer time is required for the station finding procedure. Assume that as the search range is widened by one step (e.g., from "less than 1 m" to "1 to 10 m"), the number of subsidiary stations newly included in the search range increases. In this case, since the station finding procedure must be variously operated for each subsidiary station, the time required for the station finding procedure abruptly increases.

In the control information setting processing executed by the control information setting section 20b of the device body 20, therefore, the user designates a station finding procedure time as a search range.

In this case, the control information setting section 20b displays, for example, the message "Designate a station finding procedure time", together with station finding procedure time choices (selection fields) for the designation of a search range. As the station finding procedure time choices, "1 second", "5 seconds", "10 seconds", and the like are displayed.

If the station finding procedure time choices, a table for linking transmission power values to station finding procedure times, like the one shown in FIG. 14, is prepared in advance. The control information setting section 20b sets, as control information, a transmission power value corresponding to the station finding procedure time designated by the user in accordance with the contents set in this table, and transmits it to the radio communication apparatus 19.

The radio communication apparatus 19 transmits the station finding message with an output corresponding to the transmission power value corresponding to the control information set by the control information setting section 20b (the details of this operation are the same as those in the station finding procedure for the case of transmission power control described with reference to FIGS. 11 and 12).

This operation makes it possible to prevent the station finding message from reaching at least subsidiary stations existing outside the search range corresponding to the time designated by the user.

If the search range narrows, the number of subsidiary stations existing in the search range may decrease. When, however, many subsidiary stations are present only near the main station, the number of subsidiary stations that can receive the station finding message may not greatly change even if the search range is narrowed. In such a special case, the time required for the station finding procedure for each subsidiary station remains the same.

The control information setting section 20b therefore may output a designated station finding procedure time itself as control information to the radio communication apparatus 19 as well as setting a search range by setting a transmission power value in accordance with the station finding procedure time designated by the user.

In this case, the radio communication apparatus control section 28 of the radio communication apparatus 19 transmits the station finding message in accordance with the transmission power value, and monitors the time that has elapsed since the start of the transmission of the station finding message to determine whether the station finding message has reached within the station finding procedure time set as the control information.

If the station finding message has reached within the station finding procedure time, the transmission of the station finding message is forcibly stopped, and the station finding processing is terminated. This makes it possible to complete the station finding procedure within the station finding procedure time designated by the user.

The above case is a special case. In general, even if the station finding procedure is terminated within the station finding procedure time, the subsidiary station designated as a connection target by the user is registered as long as the station finding procedure is completed between the main station and all the subsidiary stations existing in the search range within the station finding procedure time. In addition, even if the station finding procedure for all the subsidiary stations is not complete, there is a good possibility that the subsidiary station designated as a connection target by the user is registered (because the user designates a station finding procedure time as circumstances demand).

Since a search range can be set by designating a station finding procedure time in this manner, an optimal station finding procedure conforming to a request from the user, i.e., a station finding procedure optimized to prevent an excessively long period of time from being spent to register a subsidiary station (device) as a connection target, can be executed. This makes it possible to efficiently search for a station that needs to be connected.

In the control information setting processing described with reference to the flow chart of FIG. 7, the distance from the main station (transmission power control) or antenna directivity can be arbitrarily designated by the user. However, such information including the above station finding procedure time may be arbitrarily designated.

Another method for a station finding procedure will be described next with reference to the flow chart of FIG. 15. Steps D1 to D3 and D6 to D8 in the flow chart of FIG. 15 respectively correspond to steps A1 to A3 and A4 to A6 in the flow chart of FIG. 10, and the same processing is executed in these steps. Hence, a detailed description of these steps will be omitted.

In the station finding procedure described above, when a station finding message is transmitted, and response messages from subsidiary stations existing in the search range for the station finding message are received, all the pieces of unique ID information of the subsidiary stations, contained in the respective response messages, are sequentially registered.

If, however, the station finding procedure is terminated when registration about the subsidiary station (device) designated as a connection target by the user is complete, the time required for the processing can be further shortened.

Figure 15:
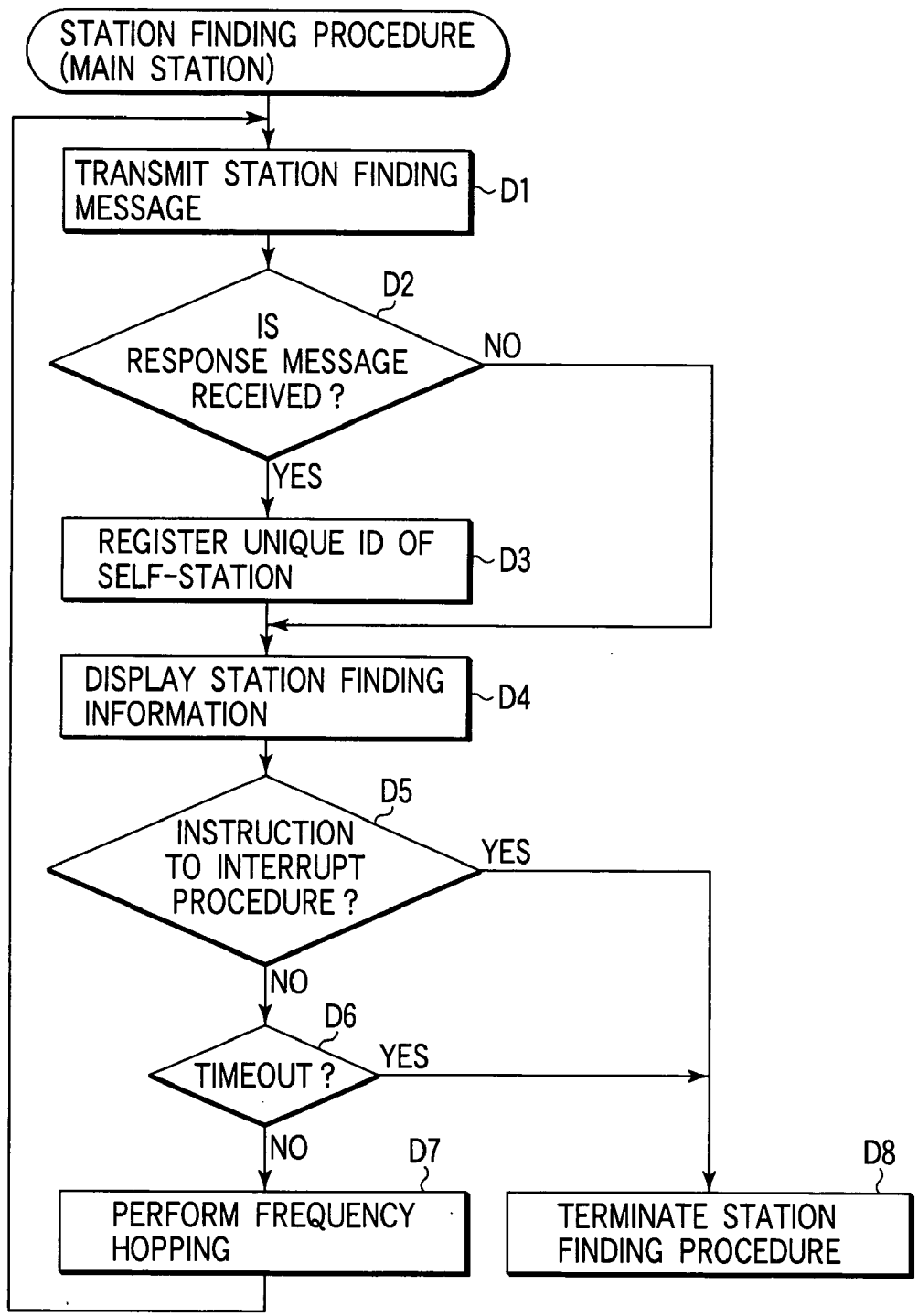
FIG. 15 is a flow chart showing another method of a station finding procedure.

In the station finding procedure, when the unique ID information of a subsidiary station, contained in a response message received from the subsidiary station, is registered (step D3), the station finding procedure section 28a notifies the device body 20 of its unique ID information, as shown in the flow chart of FIG. 15.

The display section 20a in the device body 20 displays station finding information on the basis of the unique ID information of the subsidiary station, acquired from the response message by the radio communication apparatus 19 (step D4).

If, for example, the station finding information is a device address, the display section 20a displays information that can be acquired from the received response message, as shown in FIG. 16A.

In the case shown in FIG. 16A, device numbers starting from "1" are sequentially assigned in the order in which the devices are searched out, and device addresses, e.g., "A39B31", are displayed in correspondence with the device numbers.

In this manner, the display section 20a sequentially displays pieces of station finding information (device addresses) while assigning the device numbers "2", "3", . . . every time a response message for the station finding message is received from a subsidiary station, i.e., a subsidiary station can be searched out.

If, therefore, the user remembers the device address of a device as a connection target, the user of the main station can know in real time that the desired device is searched out by the station finding procedure.

Even if the user does not remember the device address of a device as a connection target, since a character at a predetermined digit position of the device address generally indicates the type of device, the user of the main station can determine on the basis of the character whether the desired device is searched out.

The display section 20a displays the station finding information about the subsidiary station that has been searched out, and accepts an instruction to interrupt the station finding procedure executed by the station finding procedure section 28a.

When, therefore, the user confirms, on the basis of the station finding information displayed during the station finding procedure, that the search for the desired device is complete, the user of the main station can generate an instruction to interrupt the station finding procedure.

Upon reception of the instruction to interrupt the station finding procedure, the device body 20 notifies the radio communication apparatus control section 28 in the radio communication apparatus 19 of the instruction. The station finding procedure section 28a of the radio communication apparatus control section 28 then terminates the station finding procedure in accordance with the notification from the device body 20 (steps D5 and D8).

In this manner, if the user knows information about a subsidiary station as a connection target in advance, information (station finding information) about a subsidiary station acquired by the station finding procedure is sequentially displayed to notify the user of the information so as to interrupt the station finding procedure in accordance with a notification from the user, thus saving an unnecessary time for the station finding procedure. This scheme allows more efficient station finding if a scheme of widening the reachable range of the station finding message stepwise is used, in particular.

As an example of displaying station finding information, FIG. 16A shows an example of displaying only device addresses. However, as shown in FIG. 16B, name information about a device as a connection target may be acquired and displayed to notify the user of a found device so as to allow the user of the main station to easily recognize it.

In the case shown in FIG. 16B, device classifications ("PC", "printer", and the like) and device names ("Luna", "Apolon", and the like) are displayed in correspondence with the device numbers.

Since a character at a predetermined digit position of each device address represents the type of a device, device classifications can be discriminated and displayed on the basis of such characters.

The device names are acquired by performing procedures such as device connection (Paging procedure) and name request command procedure (a service by Link Manager).

The device connection procedure and name request command procedure described above may be omitted by storing device name information acquired in the past, together with device addresses, and acquiring the stored device name information on the basis of the device address acquired by the station finding procedure.

If various pieces of information about a device set as a connection target can be independently registered as well as the device name, the user can be notified of the found device so as to more easily recognize it by displaying these pieces of information together with the device name.

By displaying other information such as a device name in this manner instead of displaying only a device address, the user can be notified of a device as a connection target so as to more easily recognize it.

In the arrangement shown in FIG. 1, the functions implemented by the display section 20a and control information setting section 20b are provided for the device body 20. However, these functions may be provided for the radio communication apparatus 19.

The techniques in the station finding procedure described in the above embodiment can be stored as computer-executable programs in a storage medium such as a magnetic disk (e.g., a floppy disk or hard disk), an optical disk (e.g., a CD-ROM or DVD), or a semiconductor memory and can be provided for various apparatuses. These programs can also be transmitted and provided for various apparatuses through communication media. A computer for implementing this apparatus loads a program recorded on a recording medium or receives it through a communication medium, and the operation of the computer is controlled by the program, thereby executing the above processing.

As has been described above, according to the present invention, the reachable range of the station finding message is changed in searching for a station as a connection target so as to efficiently perform a station finding procedure in a short period of time. In addition, since stations that need not be connected are excluded, a station as a connection target can be efficiently designated from stations that can be searched out afterward. This makes it possible to implement a station finding procedure with high operability for the user.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication system comprising a first device and a second device for communicating with the first device through a wireless link,
   the first device including:
   a section which sets a range for a message transmitted from the first device, wherein the message is for searching for the second device to be communicated with the first device, and
   a section which causes the first device to transmit a message in accordance with the range set by said setting section, wherein the range set by said setting section is a directivity of the message transmitted from the first device,
   the second device including:
   a section which sets the message, and
   a section which responds to the message from the first device so as to set the wireless link.

2. A system according to claim 1, wherein the range which is set by said setting section is a distance from the first device.

3. A communication method for setting a wireless link between a first device and a second device, comprising:
   setting a range for a message transmitted from the first device, wherein the message is for searching for the second device to be communicated with the first device;
   causing the first device to transmit a message in accordance with the set range, wherein the range set by said setting step is a directivity of the message transmitted from the first device;
   receiving the message from the first device and outputting a response with respect to the received message from the second device; and
   setting the wireless link between the first device and second device based on the response.

4. A method according to claim 3, wherein the range which is set by said setting step is a distance from the first device.

5. A communication apparatus comprising:
   a section which sets a range for a message, wherein the message is for searching for another device to be communicated with the apparatus through a wireless link; and
   a section which transmits the message in accordance with the set range by said setting section;

wherein said setting section inputs a direction from the apparatus as a range, and said message transmission section includes a section for changing a direction in which the message is transmitted, and controls said changing section in accordance with the direction set by said setting section so as to transmit the message.

6. An apparatus according to claim 5, wherein said setting section inputs a distance from the self-apparatus as a range for the message, and said message transmission section transmits a message with a transmission power value corresponding to the distance input by said setting section.

7. An apparatus according to claim 5, wherein said setting section comprises a section for inputting a time during which transmission of the message continues, and said message transmission section transmits the message only for the time input by said setting section.

8. An apparatus according to claim 5, further comprising:

a section for sequentially displaying information acquired by the response message from the another apparatus every time the response message is received; and a section for terminating transmission of the message when an instruction to interrupt the transmission of the message is input in accordance with the information displayed by said display section.

9. A communication system having a first device and a second device for communicating with the first device through a wireless link, comprising:

a first device which transmits a message for searching for the second device by radio communication, wherein the first device comprises:

a main body which sets a range for the message transmitted from the first device and which outputs first control information in accordance with the set range;

a controller, connected to the main body via a data interface section, which receives the first control information from the main body and which outputs second control information based on the received first control information;

a transmission amplifier, connected to the controller, which amplifies the message based on the second control information and which transmits the amplified message to an antenna so as to transmit the message in accordance with the range set by the main body; and an antenna control section, connected to the controller and the antenna, which controls an antenna directivity of the antenna based on the second control information output from the controller so as to transmit the message in accordance with the range set by the main body.

10. A communication system according to claim 9, wherein the range set by the main body indicates a distance from the first device.

11. A communication system according to claim 9, wherein the range set by the main body indicates a directivity of the message transmitted from the first device.

12. A communication system according to claim 9, wherein the controller has a table which stores the first control information output from the main body and the controller outputs the first control information to one of the transmission amplifier and antenna control section.

13. A communication method for setting a wireless link between a first device and a second device, comprising the steps of:

setting a range for a message transmitted from the first device in a main body of the first device and outputting first control information in accordance with the set range from the main body, wherein the message is for searching for the second device;

receiving the first control information from the main body in a controller connected to the main body via a data interface, and outputting second control information based on the received first control information from the controller; and controlling one of a transmission amplifier, connected to the controller, which amplifies the message based on the second control information and which transmits the amplified message to an antenna and an antenna control section, connected to the controller and the antenna, which controls an antenna directivity of the antenna based on the second control information output from the controller.

14. A communication apparatus comprising:

a main body which sets a range for a message transmitted from the communication apparatus and which outputs control information in accordance with the set range, wherein the message is for searching for a device as a connection target by radio communication;

a controller, connected to the main body via a data interface section, which receives the first control information from the main body and which outputs second control information based on the received first control information;

a transmission amplifier, connected to the controller, which amplifies the message based on the second control information and which transmits the amplified message to an antenna so as to transmit the message in accordance with the range set by the main body; and an antenna control section, connected to the controller and the antenna, which controls an antenna directivity of the antenna based on the second control information output from the controller so as to transmit the message in accordance with the range set by the main body.

15. A communication apparatus according to claim 14, wherein the range set by the main body indicates a distance from the communication apparatus.

16. A communication apparatus according to claim 14, wherein the range set by the main body indicates a directivity of the message transmitted from the communication apparatus.

17. A communication apparatus according to claim 14, wherein the controller has a table which stores the first control information output from the main body and the controller outputs the first control information to one of the transmission amplifier and antenna control is section.

18. A communication system having a first device and a second device for communicating with the first device through a wireless link, comprising:

the first device including;

a first outputting section for outputting a message to a first range in which the second device and an external device are positioned, a second outputting section for outputting the message to a second range in which the second device is positioned, the external device positioning out of the second range, wherein the second range represents a directivity of the message transmitted from the first device, and a section which selects one of the first outputting section and the second outputting section, the second device including;
a section which receives the message, and a section which responds to the message from the first device so as to set the wireless link.

19. A communication system according to claim 18, wherein the second range represents a distance from the first device.

20. A communication device for communicating with an external device through a wireless link, comprising:
a first outputting section which outputs a message to a first range in relation to a position of the external device, the message being used to set the wireless link, wherein the first range represents a directivity of the message transmitted from the communication device;
a second outputting section which outputs the message to a second range different from the first range; and
a section which selects one of the first outputting section and the second outputting section.

21. A communication device according to claim 20, wherein the first range represents a distance from the communication device.

22. A method for setting a wireless link between a first device and a second device, comprising the steps of:
determining one of a first range and a second range in relation to the position of the second device;
outputting a message from the first device to one of the first range and second range determined, wherein the first range represents a distance from the first device and the second range represents a directivity of the message transmitted from the first device;
receiving a response to the message, from the device; and
setting the wireless link on the basis of the response.

23. A communication system comprising a first device and a second device for communicating with the first device through a wireless link,
the first device including:
a section which sets a user-designated search range for a message transmitted from the first device, wherein the message is for searching for the second device to be communicated by the first device, and
a section which causes the first device to transmit a message in accordance with the range set by said setting section,
the second device including:
a section which sets the message, and
a section which responds to the message from the first device so as to set the wireless link.

* * * * *